(12) United States Patent
Zhang et al.

(10) Patent No.: US 9,134,772 B2
(45) Date of Patent: Sep. 15, 2015

(54) MOUNTING APPARATUS FOR HARD DISK DRIVE AND ELECTRONIC DEVICE WITH THE MOUNTING APPARATUS

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Guang-Yi Zhang, Shenzhen (CN); Xiao-Zheng Li, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 153 days.

(21) Appl. No.: 14/049,224

(22) Filed: Oct. 9, 2013

(65) Prior Publication Data

US 2015/0062801 A1 Mar. 5, 2015

(30) Foreign Application Priority Data

Aug. 27, 2013 (CN) .......................... 2013 1 0377620

(51) Int. Cl.
| | |
|---|---|
| *G06F 1/16* | (2006.01) |
| *H05K 5/00* | (2006.01) |
| *H05K 7/00* | (2006.01) |
| *G06F 1/18* | (2006.01) |
| *F16C 29/00* | (2006.01) |
| *A47B 46/00* | (2006.01) |

(52) U.S. Cl.
CPC ................ *G06F 1/187* (2013.01); *A47B 46/00* (2013.01); *F16C 29/00* (2013.01)

(58) Field of Classification Search
CPC ............................... G06F 1/187; A47B 46/00
See application file for complete search history.

(56) References Cited

U.S. PATENT DOCUMENTS

| | | | | | |
|---|---|---|---|---|---|
| 5,572,402 | A | * | 11/1996 | Jeong ........................ | 361/679.31 |
| 5,586,003 | A | * | 12/1996 | Schmitt et al. ........... | 361/679.58 |
| 5,692,208 | A | * | 11/1997 | Felcman et al. ......... | 361/679.38 |
| 6,411,505 | B1 | * | 6/2002 | DiFonzo et al. .......... | 361/679.38 |
| 6,972,949 | B1 | * | 12/2005 | Helgenberg et al. ..... | 361/679.02 |
| 6,980,428 | B2 | * | 12/2005 | Ting ........................ | 361/679.36 |
| 7,019,965 | B2 | * | 3/2006 | Bradley et al. ........... | 361/679.38 |
| RE41,514 | E | * | 8/2010 | Behl et al. .................. | 312/223.1 |
| 8,369,080 | B2 | * | 2/2013 | Huang ...................... | 361/679.38 |
| 8,508,930 | B2 | * | 8/2013 | Peng et al. ............... | 361/679.33 |
| 8,582,286 | B2 | * | 11/2013 | Ulrich ...................... | 361/679.33 |
| 8,705,230 | B2 | * | 4/2014 | Wen ........................ | 361/679.38 |

(Continued)

*Primary Examiner* — Hoa C Nguyen
*Assistant Examiner* — Xanthia C Cunningham
(74) *Attorney, Agent, or Firm* — Novak Druce Connolly Bove + Quigg LLP

(57) ABSTRACT

A mounting apparatus includes a bracket receiving a hard disk drive (HDD), a transmission mechanism mounted on a side of the bracket, and an operation member. The transmission mechanism includes an installing frame, a first rack, and a second rack. The gear is engaged with the first and second racks. A first end of the operation member is detachably latched to the bracket, while a second end of the operation member is movably connected to the bracket. An abutting piece protrudes out from a rear end of the second rack and abuts against a rear end of the hard disk drive. The operation member is slid rearward, to push the first rack to slide rearward. The first rack drives the gear to rotate, the gear drives the second rack to slide forward, and the abutting piece abuts against the HDD to move the HDD out of the bracket.

20 Claims, 8 Drawing Sheets

(56) References Cited

U.S. PATENT DOCUMENTS

| | | | |
|---|---|---|---|
| 8,902,579 B1* | 12/2014 | Lalouette | 361/679.37 |
| 8,967,011 B2* | 3/2015 | Lee et al. | 74/425 |
| 2002/0101117 A1* | 8/2002 | Shibuya | 307/9.1 |
| 2002/0154477 A1* | 10/2002 | Fukasawa | 361/685 |
| 2003/0174463 A1* | 9/2003 | Chen | 361/683 |
| 2006/0291159 A1* | 12/2006 | Jiang et al. | 361/685 |
| 2008/0080130 A1* | 4/2008 | Chen | 361/685 |
| 2009/0161309 A1* | 6/2009 | Yang | 361/679.39 |
| 2010/0208423 A1* | 8/2010 | Lai | 361/679.38 |
| 2011/0182020 A1* | 7/2011 | Sato | 361/679.31 |
| 2011/0299237 A1* | 12/2011 | Liang | 361/679.38 |
| 2012/0057292 A1* | 3/2012 | Ulrich | 361/679.32 |
| 2012/0134095 A1* | 5/2012 | Zhang | 361/679.33 |
| 2013/0163184 A1* | 6/2013 | Fujiwara et al. | 361/679.38 |
| 2013/0250506 A1* | 9/2013 | Fujiwara | 361/679.31 |
| 2014/0036434 A1* | 2/2014 | Jau et al. | 361/679.33 |

\* cited by examiner

MOUNTING APPARATUS FOR HARD DISK DRIVE AND ELECTRONIC DEVICE WITH THE MOUNTING APPARATUS

BACKGROUND

1. Technical Field

The present disclosure relates to electronic devices, and more particularly to an electronic device having a mounting apparatus for mounting a hard disk drive (HDD).

2. Description of Related Art

HDDs of computers are mounted in a bracket of the computers. A HDD is directly inserted into the bracket, and a large number of screws extend through sidewalls of the bracket to fix the HDD to the bracket. However, the mounting and removal of the HDD to and from the bracket requires a tool to fasten or release the screws. Thus, the assembly and disassembly of the HDD from the bracket are not only time-consuming, but also laborious.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

Figure 1:
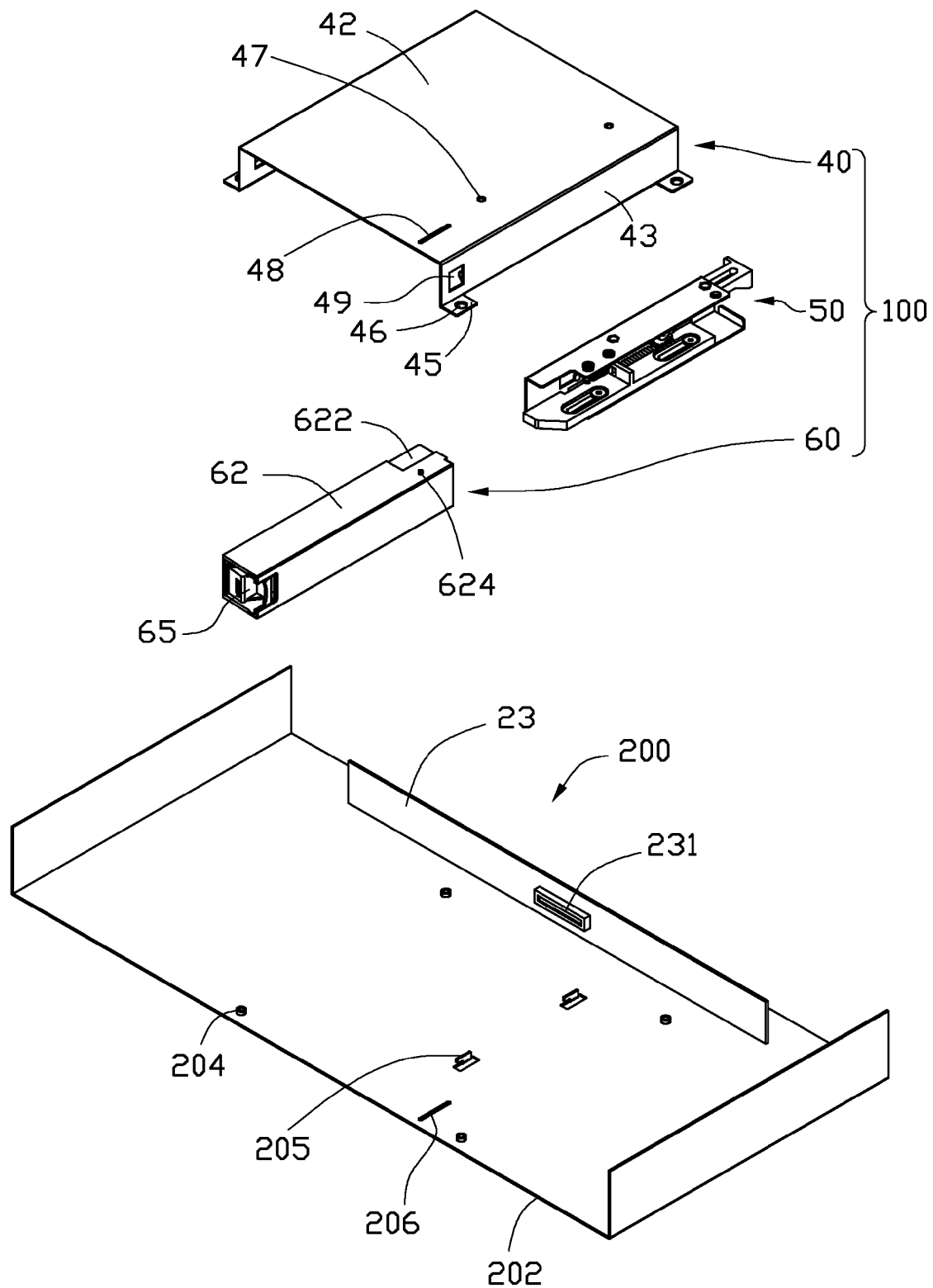
FIG. 1 is an exploded, isometric view of an embodiment of an electronic device, wherein the electronic device includes a transmission mechanism.
Figure 6:
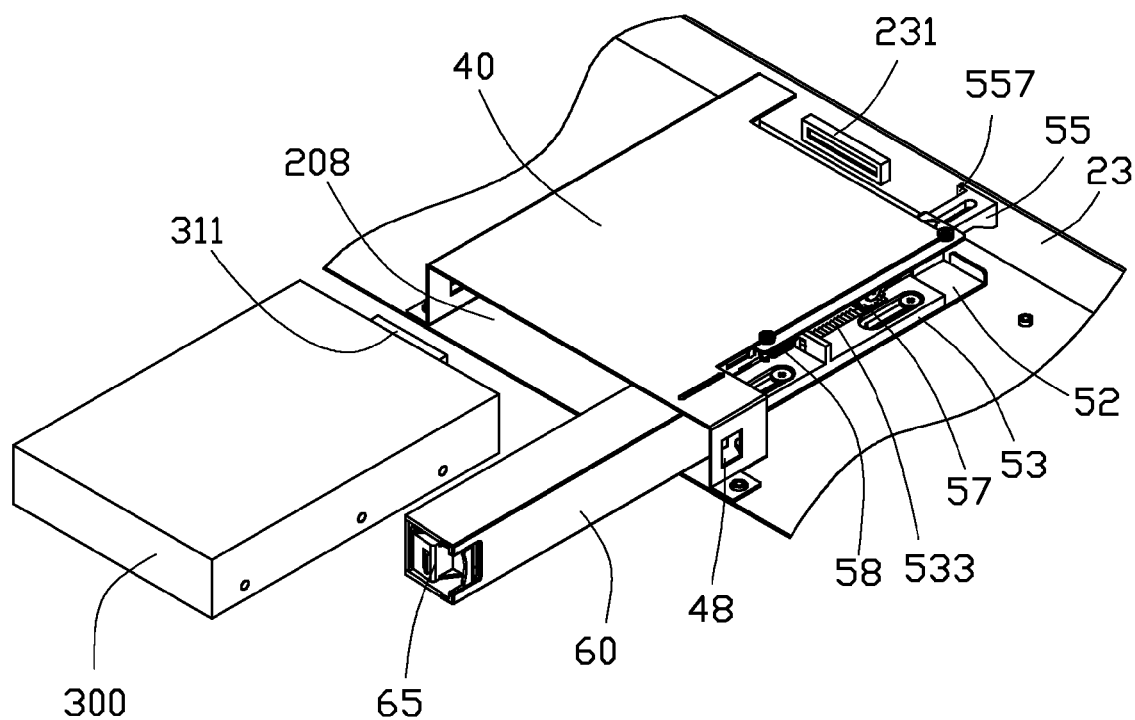
FIGS. 6-7 are views showing the process of assembling a hard disk drive to the electronic device of FIG. 1.

FIGS. 1 and 6 show an exemplary embodiment of an electronic device including a chassis 200, a hard disk drive (HDD) 300, and a mounting apparatus 100 for mounting the HDD 300 in the chassis 200. A first connector 311 is mounted to a rear end of the HDD 300. The mounting apparatus 100 includes a bracket 40, a transmission mechanism 50, and an operation member 60.

The chassis 200 includes a bottom wall 202 and a circuit board 23 mounted substantially perpendicularly to a rear side of the bottom wall 202. The bottom wall 202 defines a plurality of fastening holes 204. Two latching pieces 205 perpendicularly extend from the bottom wall 202, and are located among the fastening holes 204. A front side of the bottom wall 202 defines a guiding slot 206 extending perpendicularly to the circuit board 23. A second connector 231 is mounted on a front side of the circuit board 23, facing the latching pieces 205.

The bracket 40 includes a substantially rectangular top plate 42, two side plates 43 perpendicularly extending from two opposite sides of the top plate 42, respectively, and two tabs 45 extending out from two ends, respectively, from each side plate 43. Each tab 45 defines a through hole 46. A side of the top plate 42 defines two mounting holes 47 and a guiding slot 48. The guiding slot 48 is defined in a front end of the top plate 42 and extends toward the front and rear end of the top plate 42. Front ends of the side plates 43 each define a latching hole 49. The latching holes 49 are opposite to each other.

Figure 2:
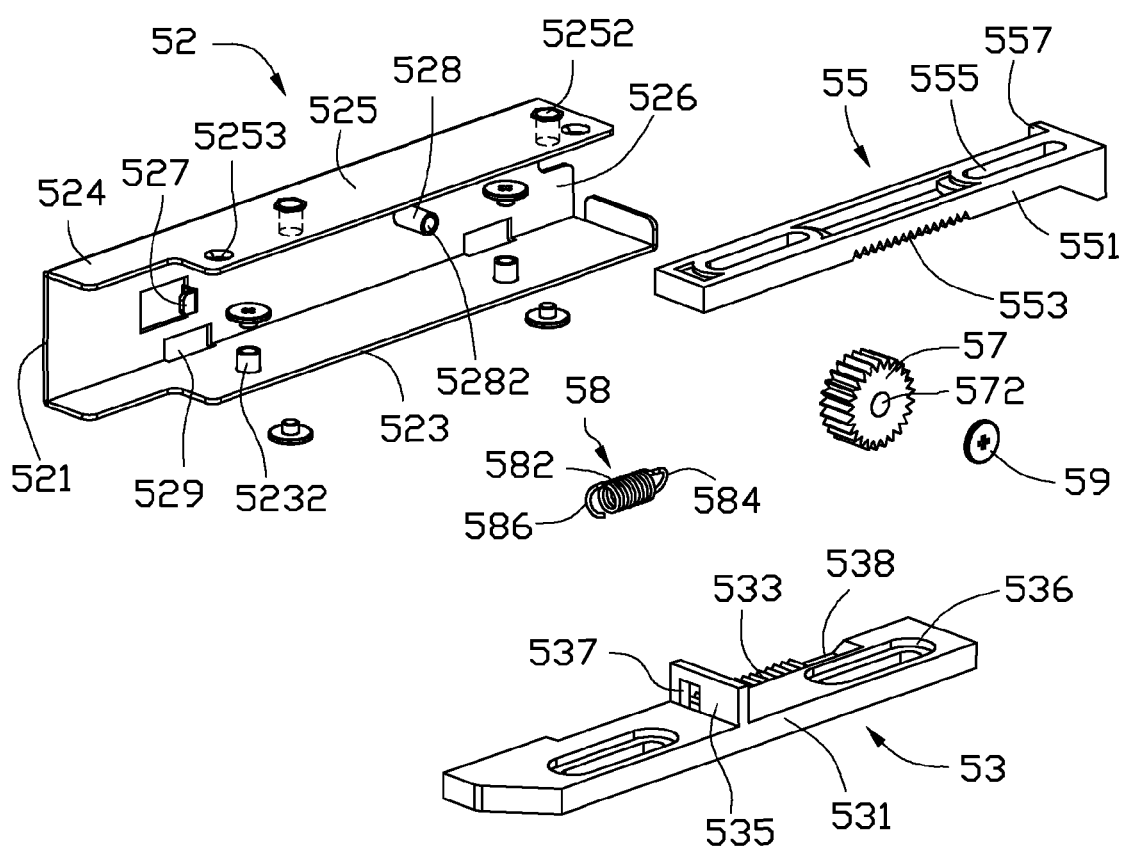
FIG. 2 is an exploded, isometric view of the transmission mechanism of FIG. 1.

FIG. 2 shows that the transmission mechanism 50 includes an installing frame 52, a first sliding member 53, a second sliding member 55, a gear 57, a resilient member 58, and a plurality of screws 59.

The installing frame 52 includes a rectangular supporting plate 521, a first connecting plate 523, and a second connecting plate 525. The first connecting plate 523 and the second connecting plate 525 perpendicularly extend from bottom and top sides of the supporting plate 521 toward the same direction. The supporting plate 521, the first connecting plate 523, and the second connecting plate 525 cooperatively define a receiving space 526. Front ends of the first and second connecting plates 523 and 525 define two opposite cutouts, to form two opposite guiding pieces 524 adjacent to the supporting plate 521. A hook 527 protrudes toward the receiving space 526 from a front end of the supporting plate 521. A shaft 528 protrudes toward the receiving space 526 from a middle of the supporting plate 521. The shaft 528 axially defines a screw hole 5282. Front and rear ends of a junction of the first connecting plate 523 and the supporting plate 521 define two positioning holes 529. Two first guiding poles 5232 extend toward the receiving space 526 from the first connecting plate 523. Two second guiding poles 5252 extend toward the receiving space 526 from the second connecting plate 525. A side of the second connecting plate 525 away from the supporting plate 521 defines two screw holes 5253. Each of the first and second guiding poles 5232 and 5252 axially defines a screw hole.

The first sliding member 53 includes a substantially rectangular first sliding plate 531, a first rack 533 formed on a side of a top surface of the first sliding plate 531, and a connecting block 535 perpendicularly protruding up from a middle of the first sliding plate 531. The first rack 533 extends along a lengthwise direction of the first sliding plate 531. The first sliding plate 531 defines a receiving slot 538 behind the first rack 533. Two opposite ends of the first sliding plate 531 respectively define two first sliding slots 536 extending along a lengthwise direction of the first sliding plate 531. The connecting block 535 defines a connecting hole 537.

The second sliding member 55 includes a substantially rectangular second sliding plate 551 and a second rack 553 formed on a side of a bottom surface of the second sliding plate 551. The second rack 553 extends along a lengthwise direction of the second sliding plate 551. Two opposite ends of the second sliding plate 551 respectively define two second sliding slots 555 extending along a lengthwise direction of the second sliding plate 551. An abutting piece 557 perpendicularly protrudes out from a rear end of the second sliding plate 551.

The gear 57 axially defines a shaft hole 572.

In the embodiment, the resilient member 58 is a spring. The resilient member 58 includes a main body 582. A first connecting portion 584 and a second connecting portion 586 extend out from two opposite ends of the main body 582, respectively.

FIG. 1 shows that the operation member 60 includes a bar-shaped operation bar 62, a block 63 (shown in FIG. 7) protruding out from a first end of the operation bar 62, and a resilient hook 65 protruding out from a second end of the operation bar 62 opposite to the block 63. The top and bottom surface of the first end of the operation bar 62 each define a guiding slot 622. The guiding slots 622 are opposite to each other. Two opposite connecting shafts 624 perpendicularly protrude out from the top and bottom surfaces, respectively, of the first end of the operation bar 62, adjacent to the guiding slots 622.

Figure 3:
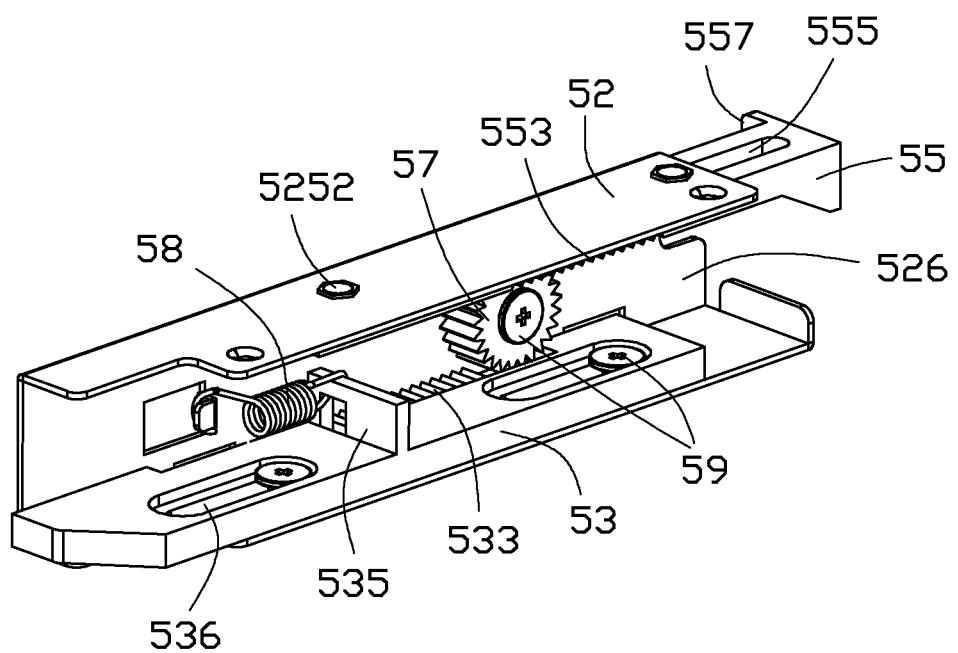
FIG. 3 is an assembled view of the transmission mechanism of FIG. 1.

FIG. 3 shows that in assembly of the transmission mechanism 50, the first sliding member 53 is received in the receiving space 526, such that a bottom surface of the first sliding member 53 engages with the first connecting plate 523. The first guiding poles 5232 are slidably received in the first sliding slots 536 of the first sliding member 53. The connecting block 535 is positioned opposite to the first connecting plate 523, and the first rack 533 is located adjacent to the supporting plate 521. The second sliding member 55 is received in the receiving space 526, such that a top surface of the second sliding member 55 engages with the second connecting plate 525. The second guiding poles 5252 are slidably received in the second sliding slots 555 of the second sliding member 55. The abutting piece 557 is located out of the rear end of the installing frame 52, and the second rack 553 faces the first rack 533.

The gear 57 is positioned between the first sliding member 53 and the second sliding member 55, such that the shaft 528 is rotatably received in the shaft hole 572 of the gear 57. The gear 57 meshes with the first rack 533 and the second rack 553.

The resilient member 58 is received in the receiving space 526 of the installing frame 52, such that the first connecting portion 584 passes through the connecting hole 537 and is connected to the connecting block 535 of the first sliding member 53, and the second connecting portion 586 is connected to the hook 527 of the installing frame 52. The screws 59 are accordingly screwed into the screw hole 5282 of the shaft 528, the screw holes of the first guiding poles 5232, and the screw holes of the second guiding poles 5252. The first sliding member 53 is slidably connected to the first connecting plate 523 via the first guiding poles 5232 and the first sliding slots 536. The second sliding member 55 is slidably connected to the second connecting plate 525 via the second connecting poles 5252 and the second sliding slots 555. The resilient member 58 is resiliently connected between the first sliding member 53 and the installing frame 52, to bias the first sliding member 53 to slide toward the front end of the installing frame 52, until the end walls bounding rear ends of the first sliding slots 536 are stopped by the first guiding poles 5232. When the first sliding member 53 is moved to the position where the end walls bounding the rear ends of the first sliding slots 536 are stopped by the first guiding poles 5232, a lower portion of the gear 57 is received in the receiving slot 538 of the first sliding member 53.

Figure 4:
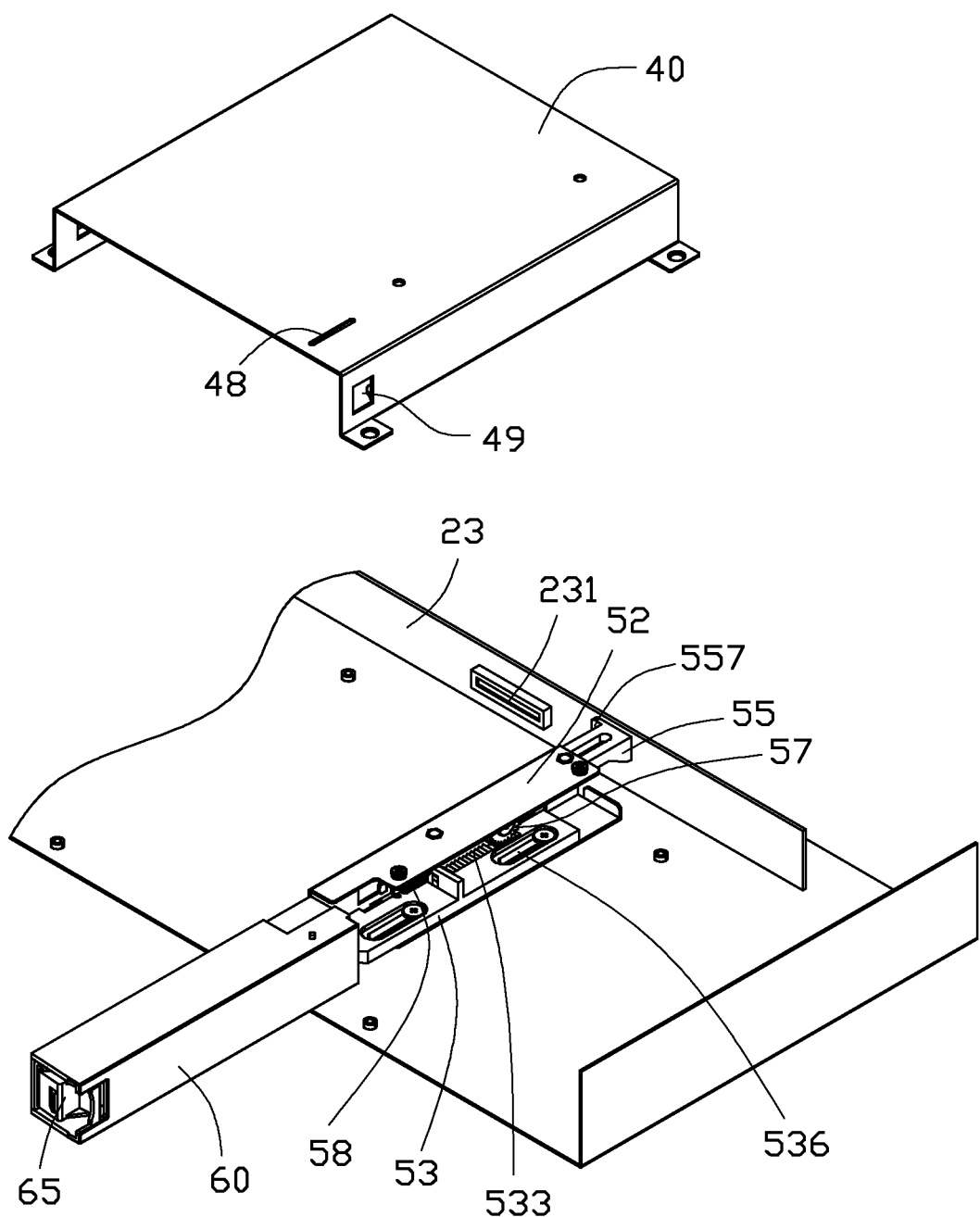
FIG. 4 is a partially assembled view of the electronic device of FIG. 1.
Figure 5:
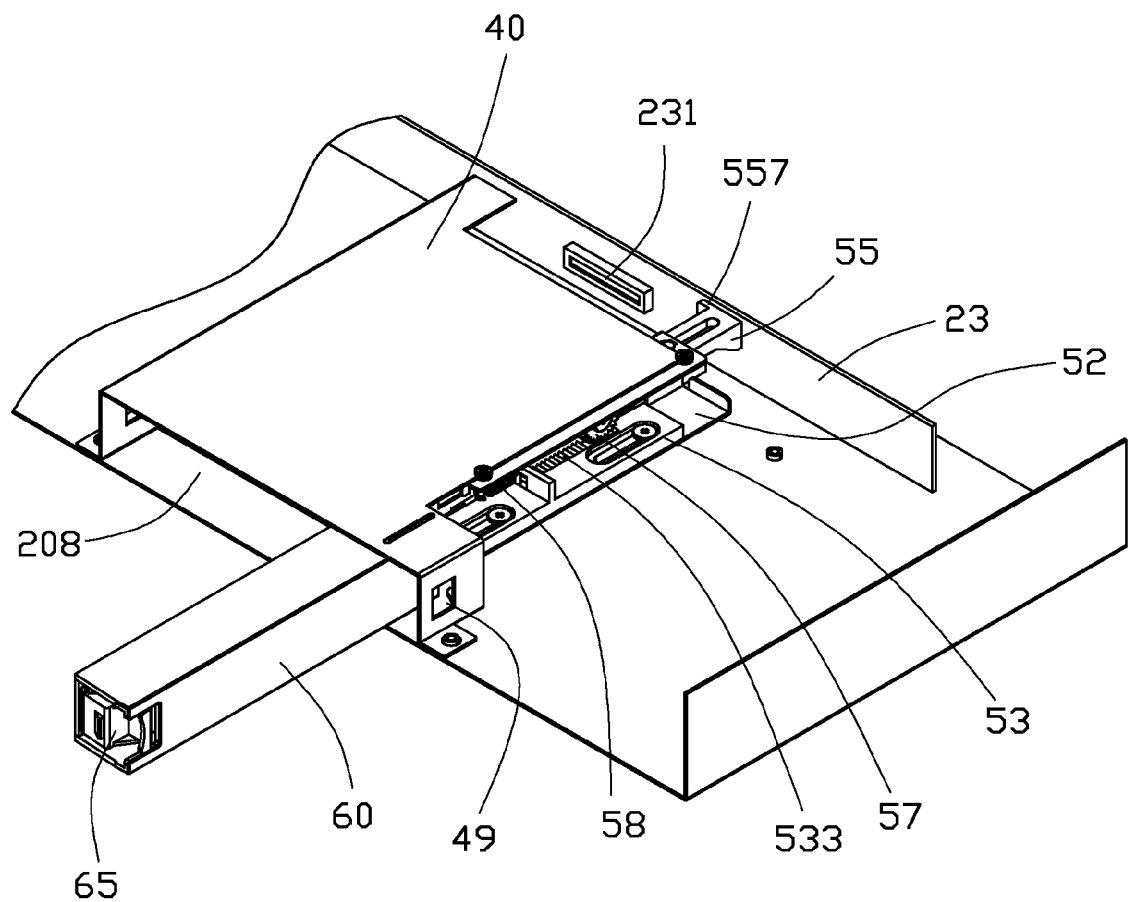
FIG. 5 is an assembled view of the electronic device of FIG. 1.

FIGS. 4 and 5 show that in assembly of the electronic device, the first connecting plate 523 of the installing frame 52 is supported on the bottom wall 202 of the chassis 200, such that the abutting piece 557 is adjacent to the second connector 231 of the circuit board 23. The latching pieces 205 are latched in the positioning holes 529 of the installing frame 52. The connecting shaft 624 positioned on the bottom of the operation bar 62 is movably received in the guiding slot 206 of the bottom wall 202, and the guiding pieces 524 align with the guiding slots 622 of the operation member 60. The bracket 40 is placed on the bottom wall 202, such that the mounting holes 47 of the top plate 42 align with the screw holes 5253 of the installing frame 52, and the through holes 46 align with the fastening holes 204 of the bottom wall 202. The connecting shaft 624 positioned on the top of the operation bar 62 is movably received in the guiding slot 48 of the bracket 40. A plurality of screws extend through the mounting holes 47 and the through holes 46, to be screwed in the screw holes 5253 of the installing frame 52 and the fastening holes 204 of the chassis 200. The bracket 40 and the bottom wall 202 cooperatively define a mounting space 208, and the second connector 231 is received in the mounting space 208. The resilient member 58 biases the first sliding member 53 to slide toward the first end of the operation bar 62, the operation bar 62 is pushed by the first sliding member 53 to slide toward the front end of the bracket 40, and the connecting shafts 624 slide along the guiding slot 48 of the bracket 40 and the guiding slot 206 of the chassis 200, until the connecting shafts 624 are stopped by end walls bounding front ends of the guiding slot 48 and the guiding slot 206.

Figure 7:
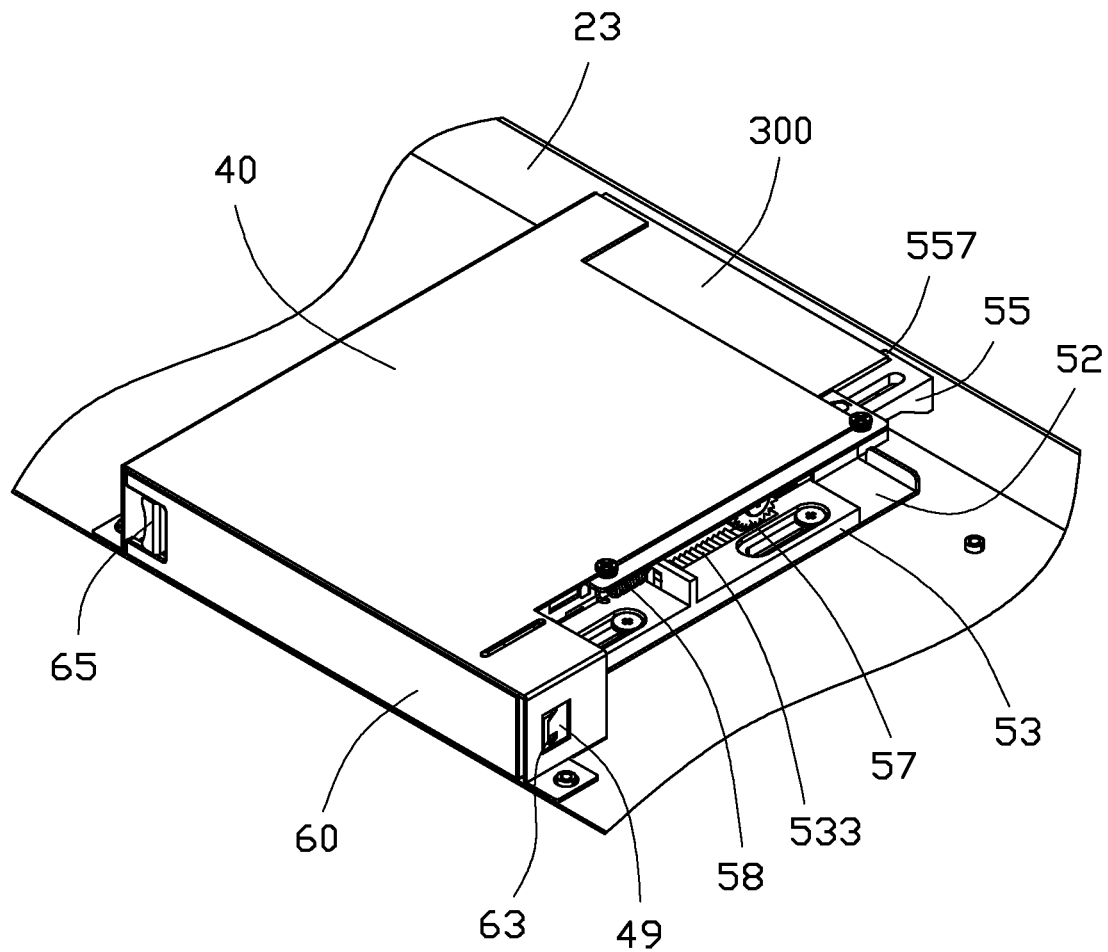

FIGS. 6 and 7 show that in use, the rear end of the HDD 300 is slidably received in the mounting space 208, until the first connector 311 of the HDD 300 is coupled to the second connector 231 of the circuit board 23. The rear end of the HDD 300 is engaged with the abutting piece 557 of the second sliding member 55. The operation bar 62 is rotated about the connecting shafts 624 toward the HDD 300, until the block 63 and the hook 65 latch in the latching holes 49. Therefore, the HDD 300 is mounted in the chassis 200.

Figure 8:
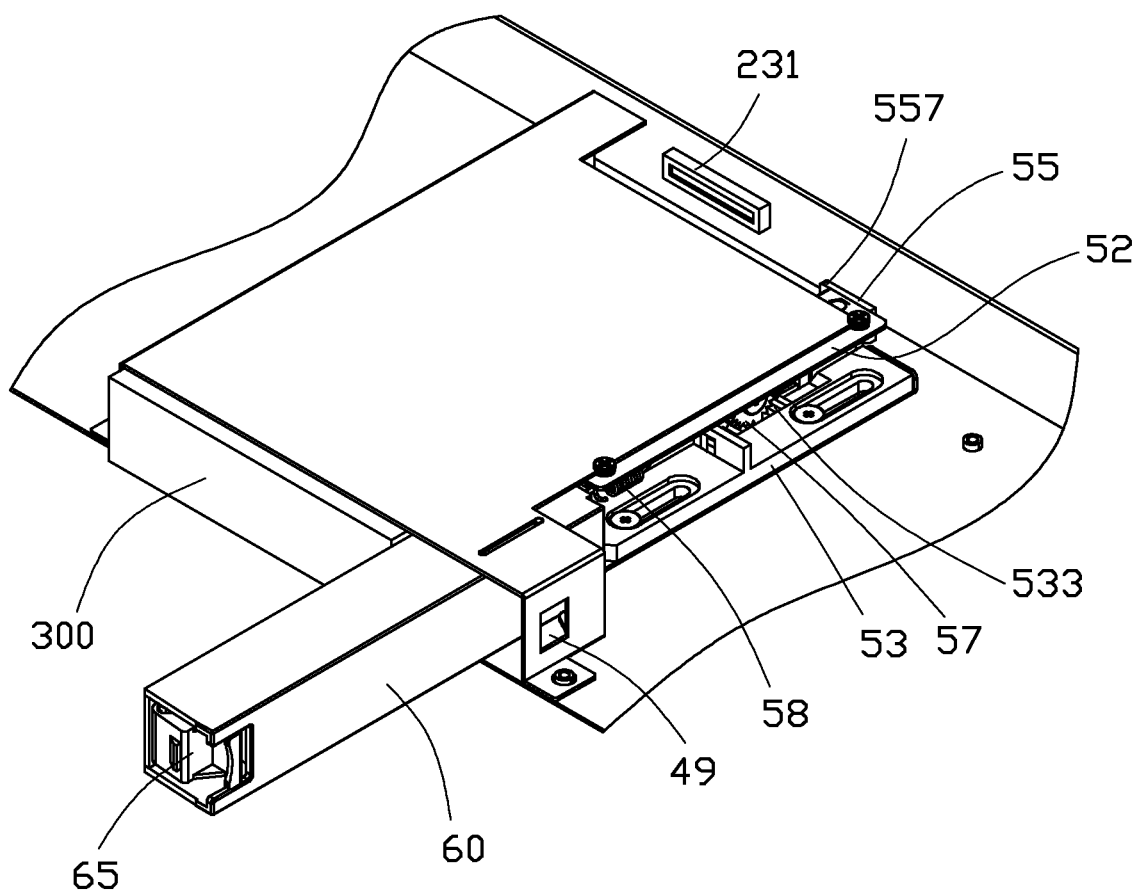
FIG. 8 shows a process disassembling the hard disk drive from the electronic device.

FIG. 8 shows that to detach the HDD 300 from the mounting apparatus 100, the hook 65 is deformed to be detached from the corresponding latching hole 49. The operation bar 62 is rotated away from the HDD 300, until the operation bar 62 is parallel to the side plates 43 of the bracket 40. The operation bar 62 is pushed toward the mounting space 208. The connecting shafts 624 slide along the guiding slot 48 and the guiding slot 206, and the guiding pieces 524 of the installing frame 52 are received in the guiding slots 622 of the operation member 60. The first sliding plate 531 is pushed rearward through the operation bar 62. The gear 57 moves out of the receiving slot 538 of the first sliding member 53, to mesh with the first rack 533. The gear 57 is rotated, and the gear 57 drives the second sliding plate 551 to slide forward. The abutting piece 557 of the second sliding plate 551 abuts against the rear end of the HDD 300, to move the HDD 300 forward. The first connector 311 of the HDD 300 is detached from the second connector 231 of the circuit board 23, until the HDD 300 is moved out of the bracket 40. Therefore, the HDD 300 can be pulled out from the mounting apparatus 100.

Even though numerous characteristics and advantages of the embodiments have been set forth in the foregoing description, together with details of the structure and function of the embodiments, the present disclosure is illustrative only, and changes may be made in detail, especially in the matters of shape, size, and arrangement of parts within the principles of the embodiments to the full extent indicated by the broad general meaning of the terms in which the appended claims are expressed.

What is claimed is:

1. A mounting apparatus for a hard disk drive, the mounting apparatus comprising:
   a bracket for receiving the hard disk drive;
   a transmission mechanism comprising an installing frame mounted to a first side of the bracket, a first rack slidably received in the installing frame in a fore-and-aft direction, a second rack slidably received in the installing frame in the fore-and-aft direction, and a gear rotatably mounted to the installing frame and between the first and second racks, the gear meshing with the first and second racks, an abutting piece protruding from a rear end of the second rack; and an operation member comprising a first end movably mounted to the first side of the bracket, wherein a second end of the operation member detachably latches to a second side of the bracket to block a front end of the hard disk drive received in the bracket;

wherein, to release the hard disk, the second end of the operation member is operated to be detached from the bracket, and rotated away from the hard disk drive, until the first end of the operation member aligns with the first rack, the operation member is slid rearward, to push the first rack to slide rearward, the first rack drives the gear to rotate, the gear drives the second rack to slide forward, and the abutting piece abuts against the hard disk drive to move the hard disk drive out of the bracket.

2. The mounting apparatus of claim 1, wherein the bracket comprises a top plate and two side plates extending down from two opposite sides of the top plate, front ends of the side plates define two latching holes, the operation member comprises an operation bar, a resilient hook protruding out from the second end of the operation bar, and a block protruding out from the first end of the operation bar, the block and the hook are latched in the two latching holes of the bracket, in response to the second end of the operation member being latched in the second side of the bracket.

3. The mounting apparatus of claim 2, wherein a rear end of the top plate defines a guiding slot adjacent to the transmission mechanism, the guiding slot extends along a sliding direction of the operation member, a connecting pole protrudes out from the first end of the operation member, the connecting pole is slidably and rotatably received in the guiding slot of the bracket.

4. The mounting apparatus of claim 1, wherein the transmission mechanism further comprises a first sliding member and a second sliding member opposite to the first sliding member, the first and second sliding members are slidably received in the installing frame, the first rack is formed on the first sliding member, the second rack is formed on the second sliding member.

5. The mounting apparatus of claim 4, wherein the installing frame comprises a rectangular supporting plate, a first connecting plate and a second connecting plate extending from bottom and top sides of the supporting plate along a same direction, the first and second sliding members are connected to inner sides of the first and second connecting plates, the gear is rotatably mounted to the supporting plate and placed between the first and second sliding members.

6. The mounting apparatus of claim 5, wherein the abutting piece protrudes out from a rear end of the second sliding plate.

7. The mounting apparatus of claim 5, wherein the supporting plate, and the first and second connecting plates cooperatively bound a receiving space, two first guiding poles extend toward the receiving space from the first connecting plate, the first sliding member comprises a first sliding plate defining two first sliding slots, the first sliding slots extend along a sliding direction of the first sliding plate, the first guiding poles are slidably received in the first sliding slots of the first sliding plate, the first rack is formed on a top surface of the first sliding plate.

8. The mounting apparatus of claim 7, wherein the second sliding member comprises a second sliding plate defining two second sliding slots, the second sliding slots extend along a sliding direction of the second sliding plate, two second guiding poles extend toward the receiving space, the second guiding poles are slidably received in the second sliding slots of the second sliding plate, the second rack is formed on a bottom surface of the second sliding plate.

9. The mounting apparatus of claim 7, wherein a shaft extends toward the receiving space from the supporting plate, the shaft is placed between the first and second racks, the gear is rotatably fitted about the shaft.

10. The mounting apparatus of claim 7, wherein the first sliding plate defines a receiving slot behind the first rack, a lower portion of the gear is received in the receiving slot, in response to the second end of the operation member being latched in the second side of the bracket.

11. The mounting apparatus of claim 1, wherein the transmission mechanism further comprises a resilient member connected between the first sliding member and the installing frame, the resilient member biases the first sliding member to slide forward.

12. An electronic device, comprising:
a chassis;
a hard disk drive; and
a mounting apparatus comprising:
a bracket mounted in the chassis, and bounding a first receiving space together with the chassis, for receiving the hard disk drive;
a transmission mechanism comprising an installing frame mounted in the first receiving space and adjacent to a first side of the bracket, a first rack slidably received in the installing frame in a fore-and-aft direction, a second rack slidably received in the installing frame in the fore-and-aft direction, and a gear placed between the first and second racks and meshing with the first and second racks, an abutting piece protruding from a rear end of the second rack; and
an operation member comprising a first end rotatably and slidably mounted to the first side of the bracket, wherein a second end of the operation member detachably latches to a second side of the bracket to block a front end of the hard disk drive received in the bracket;
wherein, to release the hard disk, the second end of the operation member is operated to be detached from the bracket, and rotated away from the hard disk drive, until the first end of the operation member aligns with the first rack, the operation member is slide rearward, to push the first rack to slide rearward, the first rack drives the gear to rotate, the gear drives the second rack to slide forward, and the abutting piece abuts against the hard disk drive to move the hard disk drive out of the bracket.

13. The electronic device of claim 12, wherein the transmission mechanism further comprises a first sliding member and a second sliding member opposite to the first sliding member, the first and second sliding members are slidably received in the installing frame, the first rack is formed on the first sliding member, the second rack is formed on the second sliding member.

14. The electronic device of claim 13, wherein the installing frame comprises a rectangular supporting plate, a first connecting plate and a second connecting plate extending from bottom and top sides of the supporting plate along a same direction, the first connecting plate is mounted to the chassis, the first and second sliding members are connected to inner sides of the first and second connecting plates, the gear is rotatably mounted to the supporting plate and placed between the first and second sliding members.

15. The electronic device of claim 14, wherein the supporting plate, and the first and second connecting plates cooperatively bound a second receiving space, two first guiding poles extend toward the second receiving space from the first connecting plate, the first sliding member comprises a first sliding plate defining two first sliding slots, the first sliding slots extend along a sliding direction of the first sliding plate, the first guiding poles are slidably received in the first sliding slots of the first sliding plate, the first rack is formed on a top surface of the first sliding plate.

16. The electronic device of claim 15, wherein the second sliding member comprises a second sliding plate defining two second sliding slots, the second sliding slots extend along a sliding direction of the second sliding plate, two second guiding poles extend toward the second receiving space, the second guiding poles are slidably received in the second sliding slots of the second sliding plate, the second rack is formed on a bottom surface of the second sliding plate.

17. The electronic device of claim 15, wherein a shaft extends toward the second receiving space from the supporting plate, the shaft is placed between the first and second racks, the gear is rotatably fitted about the shaft.

18. The electronic device of claim 12, wherein the transmission mechanism further comprises a resilient member connected between the first sliding member and the installing frame, the resilient member biases the first sliding member to slide forward.

19. The electronic device of claim 12, wherein the installing frame defines a plurality of positioning holes, the chassis comprises a bottom wall, a plurality of latching pieces protrudes from the bottom wall, to latch in the positioning holes of the installing frame.

20. The electronic device of claim 19, wherein a front end of the bracket defines a first guiding slot adjacent to the transmission mechanism, the guiding slot extends along a sliding direction of the operation member, the bottom wall defines a second guiding slot below the first guiding slot, two connecting poles protrude out from the first end of the operation member, the connecting poles are slidably and rotatably received in the first and second guiding slots.

* * * * *